United States Patent [19]

Wetterhorn et al.

[11] 4,410,155
[45] Oct. 18, 1983

[54] CLAMP FOR PANEL MOUNTING OF GAUGE INSTRUMENTS

[75] Inventors: Richard H. Wetterhorn, Fairfield; David A. Busch, Stratford, both of Conn.

[73] Assignee: Dresser Industries, Inc., Dallas, Tex.

[21] Appl. No.: 282,632

[22] Filed: Jul. 13, 1981

Related U.S. Application Data

[60] Division of Ser. No. 139,956, Apr. 14, 1980, Pat. No. 4,310,113, which is a continuation of Ser. No. 931,809, Aug. 7, 1978, abandoned.

[51] Int. Cl.³ ............................................. F16M 13/00
[52] U.S. Cl. .................................. 248/27.1; 248/223.1
[58] Field of Search ................... 248/27.1, 27.3, 222.4, 248/223.1, 223.2, 300

[56] References Cited

U.S. PATENT DOCUMENTS

| 2,250,231 | 7/1941 | Nodine | 248/27.1 |
| 2,731,228 | 1/1956 | Baldwin et al. | 248/300 |
| 3,384,987 | 5/1968 | Prechtl | 248/DIG. 9 |
| 3,455,528 | 7/1969 | Meyer | 248/223.1 X |
| 3,689,013 | 9/1972 | Neugebauer | 248/27.1 |
| 4,310,133 | 1/1982 | Wetterhorn et al. | 248/27.1 |

OTHER PUBLICATIONS

Industrial Valve and Instrument Drawings: Drawings No. 70A229, 3/12/68, No. 70A1077, 5/12/75, No. 7A161, 3/12/68, No. 70A893, 3/12/73, No.70A1274, 6/8/76, No. 70A1207, 4/28/76.
European Design Drawing, not dated but cited by applicant as relevant prior art.

Primary Examiner—William H. Schultz
Attorney, Agent, or Firm—Daniel Rubin

[57] ABSTRACT

The stem connection of a back connected gauge instrument placed extending partially through an opening in a panel wall is received in an aperture of an elongated clamp plate adapted to span the instrument parallel to the backside of the panel. A keyed recess in communication with the plate aperture is adapted to interlock with a cooperative surface on the gauge stem at a predetermined location longitudinally spaced behind the gauge. A foot of a leg extending integrally from the plate at one end thereof toward the backside surface of the panel cooperates with a similarly extending preassembled thumb screw extending transversely through the plate at the opposite end to effect mounting. The thumb screw also serves to adjustably draw and secure the gauge into its mounted position.

2 Claims, 7 Drawing Figures

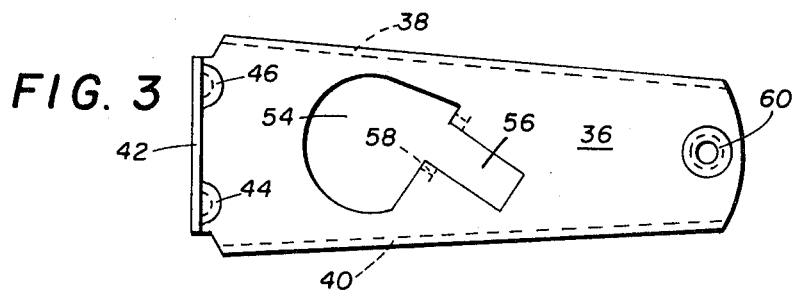
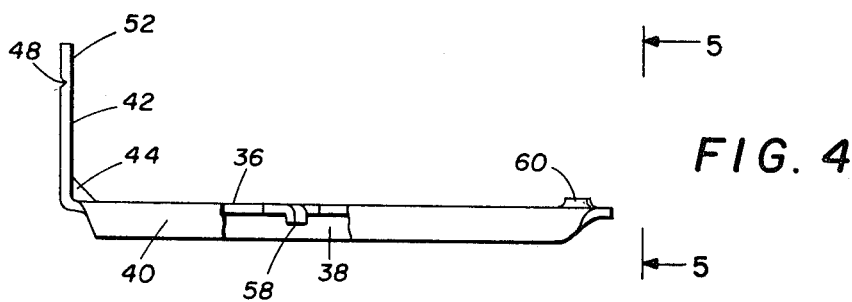
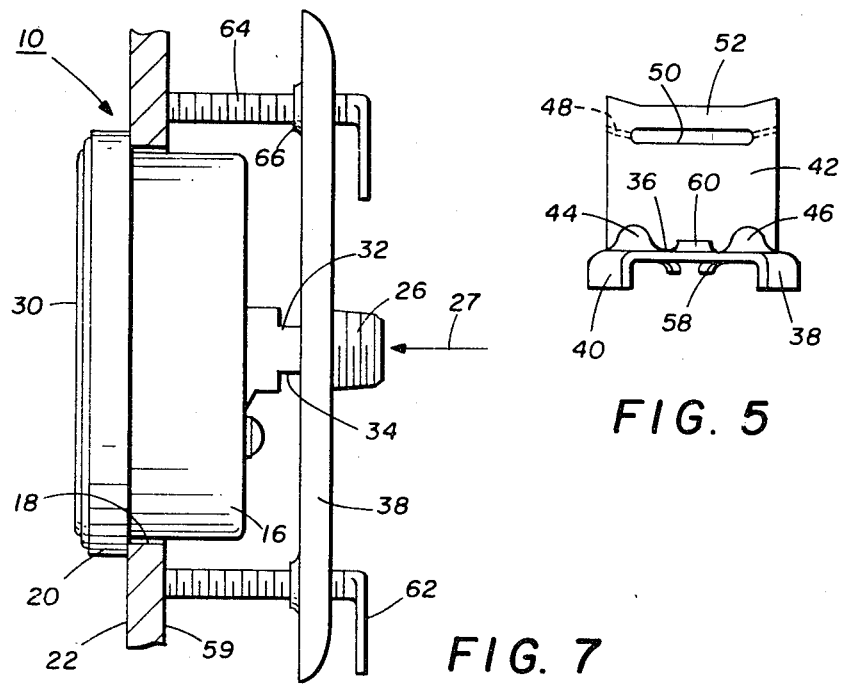

CLAMP FOR PANEL MOUNTING OF GAUGE INSTRUMENTS

This is a division of application Ser. No. 139,956, filed Apr. 14, 1980, now Pat. No. 4,310,113, which is a continuation of U.S. Ser. No. 931,809, filed Aug. 7, 1978, now abandoned.

TECHNICAL FIELD

The field of art to which the invention pertains includes the art of pressure and/or temperature gauges and panel mounting structure therefor.

BACKGROUND OF THE INVENTION

Pressure gauges enjoy very extensive commercial and industrial use and are consequently regarded as high production items. Because of their wide use, gauges are available from a plurality of manufacturers and sold in very price conscious competition. Each manufacturer instinctively strives to reduce product costs by improvements, however marginal, which reduce labor and/or materials that can contribute to cost savings in the end product.

A common installation for such gauges includes a form of concealed mounting on a panel board of sorts by which only the dial area of the gauge is generally visible from the frontside of the panel while the remainder of the gauge is substantially hidden from view. Placement of the gauge for mounting includes backing the gauge body through an aperture in the panel of diameter sufficient to pass the back case but not the larger head containing the dial face and crystal. Backing therefore continues until the crystal head is essentially backed flush against the panel face with only the gauge dial remaining visible.

The mounting structure per se for securing this relationship comprises an add-on feature, the cost of which is likewise a factor affecting cost of the end product. Typically, concealed prior art panel mountings of the mentioned type have required the use of studs or the like extending laterally from the back face of the gauge casing for receiving J or U-type clamps. The clamps are then secured into position by means of nuts threaded onto the studs via use of a wrench, pliers, etc. until the gauge is firmly supported in position. Another known mounting structure consists of a plurality of radial brackets extending from a back shoulder of the gauge head to the rear of the panel wall. The brackets usually include an offset enabling them to stand away from the shoulder and are secured by screwed takeup drawing the gauge head against the front face of the panel. In still another mounting structure, it is known to employ an annular ring surrounding the gauge case and secured thereto as by use of wedges or the like. Screws or bolts are then inserted through the ring for drawing and securing the gauge into position.

Generally common to these various prior art constructions for concealed panel mounting such gauges is the relatively complex combination of structural components and the need for tools to effect installation resulting in greater labor time spent per unit installation than would otherwise appear necessary. Despite recognition of the foregoing, a more cost effective time saving construction has heretofore been unknown.

SUMMARY OF THE INVENTION

The invention relates to clamps for concealed panel mounting of back connected gauge instruments. More specifically, the invention relates to clamps for panel mounting a back connected pressure gauge placed extending through a panel aperture with essentially only the dial face of the gauge remaining visible from the panel frontside.

This is achieved in accordance with the present invention by a clamp construction enabling rapid and tool-less installation and comprised of an elongated clamp plate having a laterally offset leg at one end effecting a more or less L-shape configuration. Centrally formed through the plate is an aperture of sufficient size to pass the rearwardly extending stem connection of a gauge to be supported. Directly communicating with the aperture as a lateral extension thereof is a slotted keyway adapted to cooperate with parallel transverse grooves on the periphery of the gauge stem for effecting both a rotational and longitudinal keyed interlock therewith. Threaded through the plate near the end opposite the leg and generally parallel thereto is a suitable thumb-screw type fastener that can be screwed inwardly against the backside of the panel. With the plate interlocked in position on the gauge stem, the leg and thumb screw cooperate in a U-shaped structure spanning the gauge such that tightening the thumb screw draws the gauge into its panel mounting relation. The clamp with the thumb screw preassembled in place are essentially a unitary structure free of any loose components, and since both the interlock and the thumb screw are essentially hand operations the use of tools to effect installation become unnecessary. With only two components constituting the clamp structure, its manufacturing cost can be held to a minimum. At the same time, installation can be completed in a matter of seconds thereby representing a significant saving in labor costs as compared to similar purpose clamp structures of the prior art.

It is therefore an object of the invention to effect a novel clamp construction for concealed panel mounting of gauge instruments.

It is a further object of the invention to provide a clamp as in the previous object that essentially enables tool-less installation thereof.

It is a still further object of the invention to effect the foregoing objects with a relatively simple and less expensive clamp effective construction as compared to such similar purpose clamps of the prior art.

BRIEF DESCRIPTION OF THE DRAWINGS

FIG. 3 is an underside plan view of the clamp hereof;

FIG. 4 is a side elevation of the clamp of FIG. 3;

FIG. 5 is an end view as seen substantially from the position 5—5 of FIG. 4;

FIG. 7 is a side elevation of a panel mounted gauge installation in accordance with a second embodiment hereof.

Figure 1:
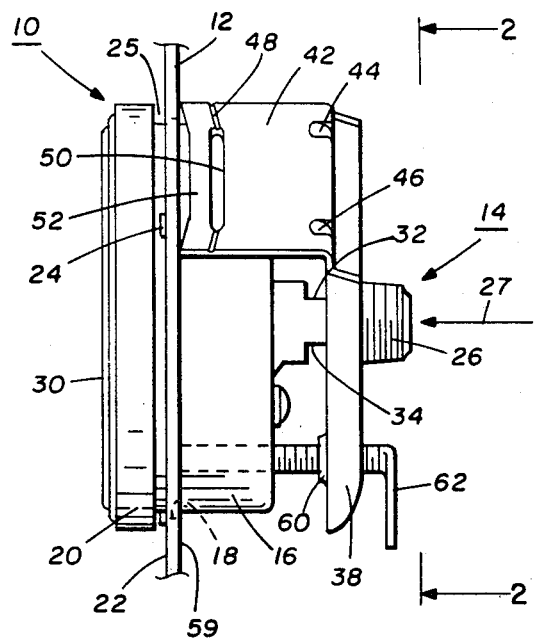
FIG. 1 is a side elevation of a panel mounted gauge installation in accordance with a first embodiment.
Figure 2:
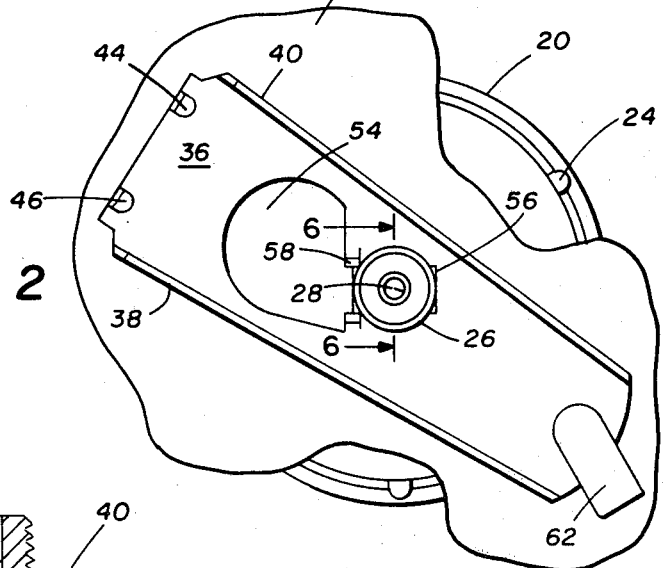
FIG. 2 is a backside view as seen substantially along the lines 2—2 of FIG. 1.
Figure 6:
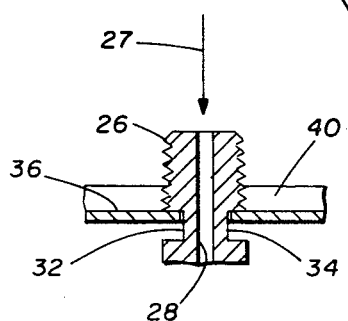
FIG. 6 is a fragmentary section taken along the lines 6—6 of FIG. 2.

Referring first to FIGS. 1 and 2 of the drawings, there is shown a pressure gauge 10 of a type contemplated for mounting against a panel wall 12 by means of a clamp 14 in accordance with the invention. Gauge 10 is of a well known type comprised of a rear casing 16 generally housing the operating components. The casing is adapted for the concealed purposes hereof to be received through a panel aperture 18 of size enabling the enlarged head comprised of a bezel 20 to be positioned against the panel front face 22. Contained within bezel 20 are crystal 30 and a dial face (not shown). Optionally, the backside of bezel 20 can either be mounted flush against panel face 22 or where desired tabs 24 can be utilized to maintain a slight clearance 25 for aiding in subsequent bezel removal.

Fluid pressure from a system to be measured, as represented by arrow 27, is normally connected via conduit to the threaded end of gauge stem 26 extending outwardly through the rear of casing 16. A central passage 28 in stem 26 leading to the operative gauge components communicate the pressure for effecting indications of pressure values in a well known manner to be indicated by a pointer and dial visible through crystal 30. For mounting the gauge in the manner to be described, stem 26 includes a pair of oppositely positioned transverse grooves 32 and 34 formed at an intermediate location between casing 16 and the stem threads.

Clamp 14, as will now be described with reference to FIGS. 1-6, is comprised of a more or less flat elongated plate 36 formed of about 3/32nd inch cold rolled steel flanged for strength along its sides 38 and 40. Plate 36 is laterally bent at one end to form an integral offset leg 42 and includes dimple recesses 44 and 46 at the bend for reinforced strength thereat. A weakening cut 48 extending transversely from the ends of oval aperture 50 to the side edges of leg 42 form a breakoff tab 52 which when required can be broken off to reduce the length of leg 42 as will be understood.

Formed at a location slightly off center in plate 36 is an opening 54 of size sufficient to readily pass the threaded end of gauge stem 26. Communicating with opening 54 and extending laterally therefrom is a slotted keyway 56 adapted to cooperate with stem grooves 32 and 34 for placing the plate in a rotational and longitudinal interlock with the stem. In addition, bent tabs 58 serve to prevent post-installation slippage of stem 26 from keyway 56. Contained near the distal end of plate 36 opposite leg 42 is a tapped aperture 60 for receiving usually pre-assembled L-head thumb screw 62. With screw 62 threadedly started into aperture 60, clamp 14 is entirely preassembled as an essentially unitary structure without any loose components.

Installation for concealed panel mounting of gauge 10 merely requires that the gauge case 16 first be backed through the panel aperture 18. The clamp 14 is then mounted onto gauge stem 26 by passing the threaded portion of stem 26 through plate opening 54. When keyway 56 is properly oriented in position to embrace parallel stem grooves 32 and 34, the keyway is slipped into the grooves to effect a rotational and longitudinal interlock therewith. With the foot of leg 42 engaging the panel backside 59, thumb screw 62 is tightened down until its distal end also engages panel backside 59. Thereafter, screw tightening is continued until bezel tabs 24 reach a flush and firm relation against panel surface 22 thereby completing the installation. Where a shorter leg 42 is required, breakoff tab 52 can be conveniently removed by bending to and fro. The entire installation in this manner can be performed in a matter of seconds and for most gauges of the more commonly used sizes can be readily installed without the use of any tools.

In the alternative embodiment of FIG. 7, clamp 14 is essentially similar to that described above but differs therefrom by the replacement of leg 42 with a second thumb screw 64 threaded into position via a second tapped aperture 66.

By the above description there has been disclosed a novel clamp for concealed panel mounting of a rear connected gauge instrument. The clamp when preassembled is entirely free of any loose components and by means of a simple interlock connection and a thumb screw adjustment can be quickly and easily placed on the gauge for panel mounting thereof. By this simple yet effective construction, the clamp is significantly less complex than similar purpose clamps of the prior art while at the same time consuming less labor time per gauge installation than previously known. The economic advantages of such a construction should therefore be readily apparent.

Since many changes could be made in the above construction and many apparently widely different embodiments of this invention could be made without departing from the scope thereof, it is intended that all matter contained in the drawings and specification shall be interpreted as illustrative and not in a limiting sense.

The embodiments of the invention in which an exclusive property or privilege is claimed are defined as follows:

1. A clamp for concealed panel wall mounting a rear inlet connected stem gauge instrument comprising in combination:
   (a) an elongated metal plate of length at least sufficient to span the width of the gauge instrument to be mounted;
   (b) a first opening defined in said plate of size at least sufficient to pass the inlet stem of the gauge having a transverse formation comprising parallel grooves oppositely located on the stem;
   (c) a centrally located keyslot opening in said plate communicating with said first opening thereof and of insufficient size to pass the inlet stem of the gauge, said keyslot opening being of predetermined geometric configuration to interfit with said transverse formation on the gauge stem for providing both a rotational and longitudinal interlock therewith;
   (d) a first lateral leg near one end of said plate extending from said plate to a distal end comprising the edge face thereof, said first lateral leg being adapted when said plate is interlocked on the gauge stem to extend in a direction toward the panel wall adjacent a first edge of the gauge instrument;
   (e) a second lateral leg near the opposite end of said plate from said first lateral leg extending from said plate to a distal end comprising the edge face thereof, said second lateral leg being adapted when said plate is interlocked on the gauge stem to extend in a direction toward the panel wall adjacent a second edge of an instrument thereat; and
   (f) both of said first and second legs being threadedly connected to said plate to be effective when their edge faces engage the panel wall for providing takeup adjustment to mount the gauge instrument securely against the panel wall.

2. A clamp according to claim 1 including lateral tabs contiguous to the open end of said keyslot and effective to preclude post-installation slippage between said plate and a gauge stem interlocked thereat.

* * * * *